US012757233B2

(12) United States Patent
Dutta et al.

(10) Patent No.: US 12,757,233 B2
(45) Date of Patent: Oct. 6, 2026

(54) SIDELINK RESOURCE SELECTION SCHEMES FOR COEXISTENCE OF MULTIPLE RADIO ACCESS TECHNOLOGIES

(71) Applicant: QUALCOMM Incorporated, San Diego, CA (US)

(72) Inventors: Sourjya Dutta, San Diego, CA (US); Gabi Sarkis, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 345 days.

(21) Appl. No.: 18/427,362

(22) Filed: Jan. 30, 2024

(65) Prior Publication Data

US 2024/0284490 A1 Aug. 22, 2024

Related U.S. Application Data

(60) Provisional application No. 63/485,510, filed on Feb. 16, 2023.

(51) Int. Cl.

*H04W 72/40* (2023.01)
*H04W 72/52* (2023.01)
*H04W 72/566* (2023.01)

(52) U.S. Cl.

CPC ........... *H04W 72/40* (2023.01); *H04W 72/52* (2023.01); *H04W 72/566* (2023.01)

(58) Field of Classification Search

CPC .... H04W 72/40; H04W 72/566; H04W 72/52
See application file for complete search history.

(56) References Cited

U.S. PATENT DOCUMENTS

| | | | | |
|---|---|---|---|---|
| 2011/0171985 | A1* | 7/2011 | Papasakellariou .... | H04W 72/02 455/509 |
| 2019/0306852 | A1* | 10/2019 | Nayeb Nazar ............ | H04L 1/00 |
| 2023/0032608 | A1* | 2/2023 | Li ......................... | H04W 72/52 |
| 2024/0121756 | A1* | 4/2024 | Dutta ..................... | H04W 72/02 |
| 2024/0147437 | A1* | 5/2024 | Hui ...................... | H04W 72/563 |
| 2024/0155605 | A1* | 5/2024 | Yang ..................... | H04L 5/0094 |

* cited by examiner

*Primary Examiner* — Mewale A Ambaye
(74) *Attorney, Agent, or Firm* — Holland & Hart LLP

(57) ABSTRACT

Methods, systems, and devices for wireless communications are described. A user equipment (UE) may receive an indication of a first set of resources that are available for communications associated with a first radio access technology (RAT) and communications associated with a second RAT. The UE may initialize, for at least transmitting one or more sidelink messages using the first RAT, a second set of resources. The second set of resources may include a subset of the first set of resources. The second set of resources may be based on usage information for the second RAT. The UE may select, for transmitting the one or more sidelink messages using the first RAT, one or more resources from the second set of resources and transmit the one or more sidelink messages using the first RAT and the one or more resources from the second set of resources.

20 Claims, 10 Drawing Sheets

SIDELINK RESOURCE SELECTION SCHEMES FOR COEXISTENCE OF MULTIPLE RADIO ACCESS TECHNOLOGIES

CROSS REFERENCE

The present application for patent claims the benefit of U.S. Provisional Patent Application No. 63/485,510 by DUTTA et al., entitled "SIDELINK RESOURCE SELECTION SCHEMES FOR COEXISTENCE OF MULTIPLE RADIOACCESS TECHNOLOGIES," filed Feb. 16, 2023, assigned to the assignee hereof, and expressly incorporated by reference herein.

FIELD OF TECHNOLOGY

The following relates to wireless communications, including sidelink resource selection schemes for coexistence of multiple radio access technologies.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

Some wireless communications systems may support sidelink communications between UEs, which may each communicate using different radio access technologies (RATs) over a common frequency band.

SUMMARY

The described techniques relate to improved methods, systems, devices, and apparatuses that support sidelink resource selection schemes for coexistence of multiple radio access technologies within a common frequency band. For example, the described techniques provide for resource selection and allocation procedures that account for time and frequency resources that are associated with different RATs. In some cases, a wireless device that utilizes a first RAT may select resources based on an estimate of a fraction of resources being utilized for communications associated with a second RAT. For example, the wireless device may receive an indication of a set of resources available for communications using multiple RATs (e.g., the first RAT, a second RAT). The wireless device may then select, for communications using the first RAT, a subset of the set of resources and may communicate using one or more resources of the subset of the set of resources. In some cases, the wireless device may select the subset of the set of resources based on usage information for the second RAT. For example, the wireless device may receive an indication of or compute (e.g., determine) a percentage (e.g., a fraction) of the set of resources that are reserved for communications using the second RAT and may select the subset of the set of resources based on the percentage. The indication may be received from a collocated wireless device communicating with the second RAT (e.g., using the second RAT) or may be based on the wireless device's own sensing. In some cases, the wireless device may determine to utilize the subset of the set of resources for communications based on receiving a resource selection trigger.

A method is described. The method may include receiving, for a wireless channel associated with coexistence of first sidelink communications associated with a first RAT and second sidelink communications associated with a second RAT, an indication of a first set of resources that are available for communications associated with the first RAT and communications associated with the second RAT, initializing, for at least transmitting one or more sidelink messages using the first RAT, a second set of resources, the second set of resources including a subset of the first set of resources, where the second set of resources is based on usage information for the second RAT on the wireless channel, selecting, for transmitting the one or more sidelink messages using the first RAT, one or more resources from the second set of resources, and transmitting the one or more sidelink messages using the first RAT and the one or more resources from the second set of resources.

An apparatus is described. The apparatus may include one or more processors, memory coupled with the one or more processors, and instructions stored in the memory. The instructions may be executable by the one or more processors to cause the apparatus to receive, for a wireless channel associated with coexistence of first sidelink communications associated with a first RAT and second sidelink communications associated with a second RAT, an indication of a first set of resources that are available for communications associated with the first RAT and communications associated with the second RAT, initialize, for at least transmitting one or more sidelink messages using the first RAT, a second set of resources, the second set of resources including a subset of the first set of resources, where the second set of resources is based on usage information for the second RAT on the wireless channel, select, for transmitting the one or more sidelink messages using the first RAT, one or more resources from the second set of resources, and transmit the one or more sidelink messages using the first RAT and the one or more resources from the second set of resources.

Another apparatus is described. The apparatus may include means for receiving, for a wireless channel associated with coexistence of first sidelink communications associated with a first RAT and second sidelink communications associated with a second RAT, an indication of a first set of resources that are available for communications associated with the first RAT and communications associated with the second RAT, means for initializing, for at least transmitting one or more sidelink messages using the first RAT, a second set of resources, the second set of resources including a subset of the first set of resources, where the second set of resources is based on usage information for the second RAT on the wireless channel, means for selecting, for transmitting the one or more sidelink messages using the first RAT, one or more resources from the second set of resources, and means for transmitting the one or more sidelink messages using the first RAT and the one or more resources from the second set of resources.

A non-transitory computer-readable medium storing code is described. The code may include instructions executable by one or more processors to receive, for a wireless channel associated with coexistence of first sidelink communications associated with a first RAT and second sidelink communications associated with a second RAT, an indication of a first set of resources that are available for communications associated with the first RAT and communications associated with the second RAT, initialize, for at least transmitting one or more sidelink messages using the first RAT, a second set of resources, the second set of resources including a subset of the first set of resources, where the second set of resources is based on usage information for the second RAT on the wireless channel, select, for transmitting the one or more sidelink messages using the first RAT, one or more resources from the second set of resources, and transmit the one or more sidelink messages using the first RAT and the one or more resources from the second set of resources.

Some examples of the method, apparatuses, and non-transitory computer-readable medium described herein may further include operations, features, means, or instructions for receiving an indication of a fraction of the first set of resources that may be reserved for the communications associated with the second RAT, where the usage information includes the fraction and where the indication of the fraction may be associated with a traffic priority value.

Some examples of the method, apparatuses, and non-transitory computer-readable medium described herein may further include operations, features, means, or instructions for monitoring the wireless channel for the communications associated with the first RAT and determining a fraction of the first set of resources that may be reserved for the communications associated with the second RAT based on the monitoring, where initializing the second set of resources may be based on the fraction.

Some examples of the method, apparatuses, and non-transitory computer-readable medium described herein may further include operations, features, means, or instructions for receiving a message triggering resource selection by the user equipment (UE), where initializing the second set of resources may be based on receiving the message.

Some examples of the method, apparatuses, and non-transitory computer-readable medium described herein may further include operations, features, means, or instructions for updating the usage information for the second RAT on the wireless channel according to a defined periodicity or a fixed duration prior to data transmission.

Some examples of the method, apparatuses, and non-transitory computer-readable medium described herein may further include operations, features, means, or instructions for updating the usage information based on one or more of: a change in one or more network conditions, a received indication to update the usage information, or both.

In some examples of the method, apparatuses, and non-transitory computer-readable medium described herein, the second set of resources includes one or more resources in a time window based on a resource selection trigger associated with the first set of resources and a bitmap indicating availability of the one or more resources.

In some examples of the method, apparatuses, and non-transitory computer-readable medium described herein, each bit of the bitmap indicates whether a respective time frequency resource may be available for the communications associated with the first RAT.

In some examples of the method, apparatuses, and non-transitory computer-readable medium described herein, each bit of the bitmap may be mapped to a resource usage fraction value.

In some examples of the method, apparatuses, and non-transitory computer-readable medium described herein, each bit of the bitmap may be mapped to a traffic priority value.

Some examples of the method, apparatuses, and non-transitory computer-readable medium described herein may further include operations, features, means, or instructions for initializing the second set of resources may be based on one or more periodically repeating slot indices.

Some examples of the method, apparatuses, and non-transitory computer-readable medium described herein may further include operations, features, means, or instructions for removing one or more resources from the second set of resources based on one or more of: control information received at the UE using the first RAT, sensor information, or a combination thereof.

DETAILED DESCRIPTION

Some wireless communications systems may support wireless devices that utilize different radio access technologies (RATs). For example, a wireless communications system may include new radio (NR) wireless devices and long term evolution (LTE) wireless devices, which, in some cases may communicate using common resources (e.g., a common time-frequency resource pool). Additionally, or alternatively, some wireless devices (e.g., dual radio wireless devices) may include multiple transceivers that utilize different RATs where resources are shared between transceivers. In some cases, while selecting resources for communications, a wireless device that communicates using a given RAT may not account for communications associated with other wireless devices using other RATs, which may result in collisions between communications associated with different RATs (e.g., interference).

In accordance with examples as described herein, a wireless device that utilizes a first RAT may perform a resource selection process that accounts for resources allocated to other RATs. For example, the wireless device may receive an indication of a set of resources available for communications using multiple RATs (e.g., the first RAT, a second RAT). The wireless device may then select, for communications using the first RAT, a subset of the set of resources and may communicate using one or more resources of the subset of the set of resources. In some cases, the wireless device may select the subset of the set of resources based on usage information for the second RAT. For example, the wireless device may receive (e.g., from a collocated wireless device, from a UE) an indication of or compute (e.g., determine) a percentage of the set of resources that are reserved for communications using the second RAT and may select the subset of the set of resources based on the percentage. In some cases, the wireless device may determine to utilize the subset of the set of resources for communications based on receiving a resource selection trigger.

Aspects of the disclosure are initially described in the context of wireless communications systems. Aspects of the disclosure are further described in the context of a bitmap configuration and a process flow. Aspects of the disclosure are also illustrated by and described with reference to apparatus diagrams, system diagrams, and flowcharts that relate to sidelink resource selection schemes for coexistence of multiple radio access technologies.

Figure 1:
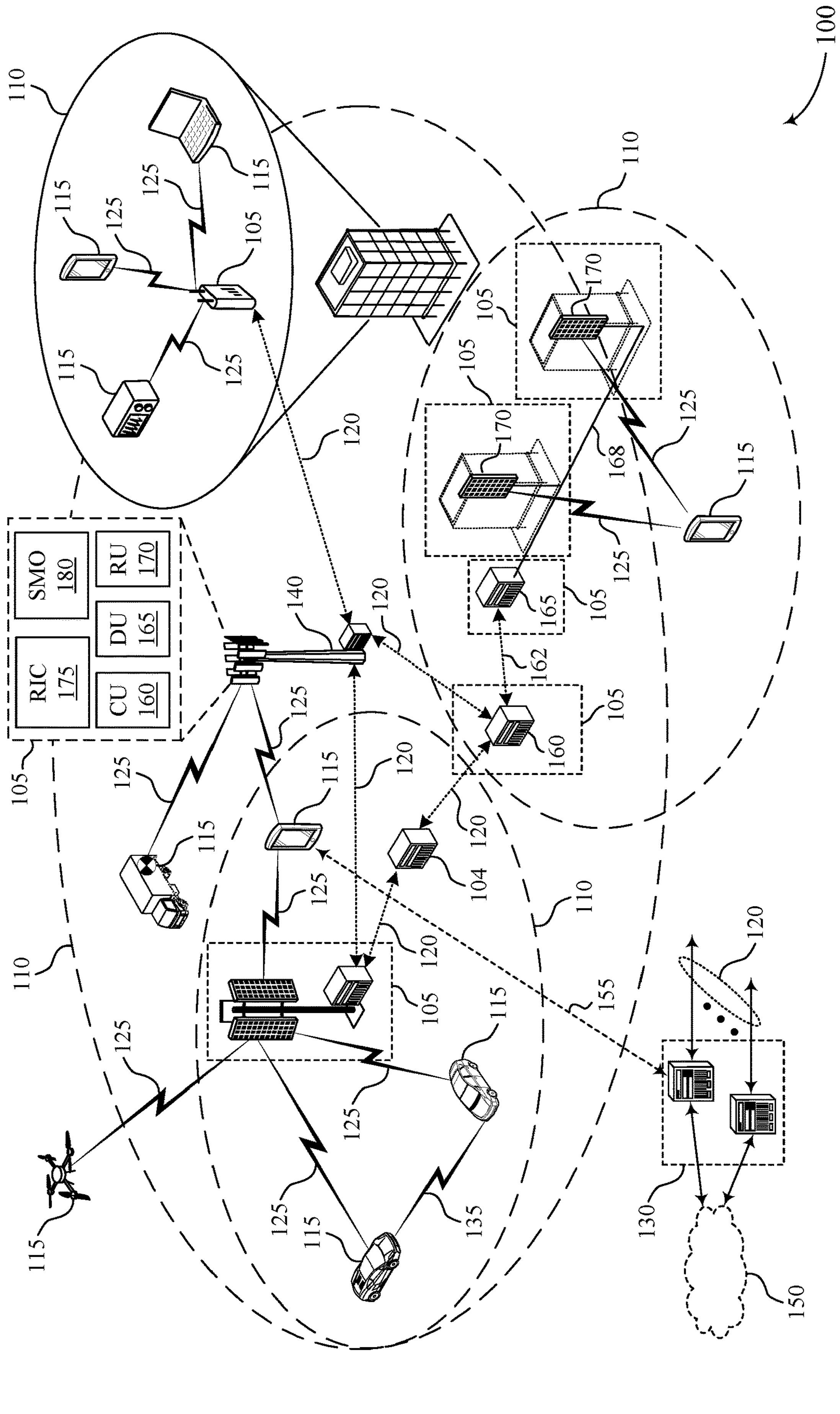
FIG. 1 illustrates an example of a wireless communications system that supports sidelink resource selection schemes for coexistence of multiple radio access technologies in accordance with one or more aspects of the present disclosure.

FIG. 1 illustrates an example of a wireless communications system 100 that supports sidelink resource selection schemes for coexistence of multiple radio access technologies in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support sidelink resource selection schemes for coexistence of multiple radio access technologies as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may support wireless devices (e.g., UEs 115, network entities 105) that utilize different radio access technologies RATs. For example, a wireless communications system may include UEs 115 that communicate using NR and UEs 115 that communicate using LTE, which, in some cases may communicate using common resources (e.g., a common time-frequency resource pool). In some cases, while selecting resources for communications, a wireless device that communicates using a given RAT may not account for communications associated with other wireless devices using other RATs, which may result in collisions between communications associated with different RATs (e.g., interference).

In accordance with examples as described herein, a wireless device that utilizes a first RAT may perform a resource selection process that accounts for resources allocated to other RATs. For example, the wireless device may receive an indication of a set of resources available for communications using multiple RATs (e.g., the first RAT, a second RAT). The wireless device may then select, for communications using the first RAT, a subset of the set of resources and may communicate using one or more resources of the subset of the set of resources. In some cases, the wireless device may select the subset of the set of resources based on usage information for the second RAT. For example, the wireless device may receive an indication of a percentage of the set of resources that are reserved for communications using the second RAT and may select the subset of the set of resources based on the percentage. In some cases, the wireless device may determine to utilize the subset of the set of resources for communications based on receiving a resource selection trigger.

Figure 2:
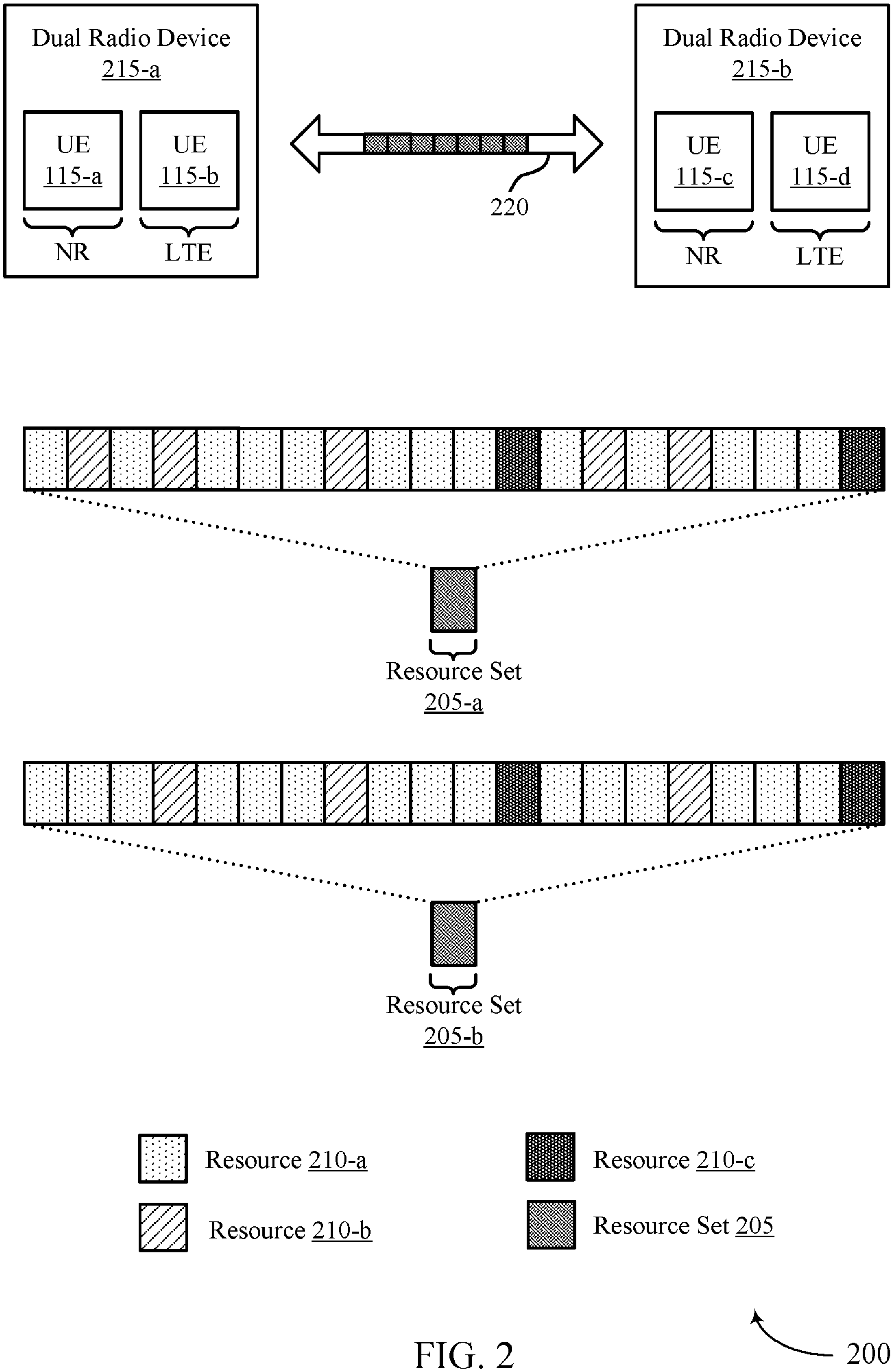
FIG. 2 illustrates an example of a wireless communications system that supports sidelink resource selection schemes for coexistence of multiple radio access technologies in accordance with one or more aspects of the present disclosure.

FIG. 2 illustrates an example of a wireless communications system 200 that supports sidelink resource selection schemes for coexistence of multiple radio access technologies in accordance with one or more aspects of the present disclosure. The wireless communications system 200 may include one or more aspects of the wireless communications system 100. For example, the wireless communications system 200 may include a UE 115-*a*, a UE 115-*b*, a UE 115-*c*, and a UE 115-*d*, which may be examples of respective UEs 115 as described with reference to FIG. 1. The wireless communications system 200 may also include a dual radio device 215-*a*, which may include the UE 115-*a* and the UE 115-*b*, and a dual radio device 215-*b*, which may include the UE 115-*c* and the UE 115-*d*. In some cases, the UE 115-*a* and the UE 115-*c* may communicate using a first RAT (e.g., NR) while the UE 115-*b* and the UE 115-*d* may communicate using a second RAT (e.g., LTE). In some cases, the UEs 115 may be examples of transceivers (e.g., radios, modules) within respective dual radio devices 215. However, in some other cases, the UEs 115 may operate independently. For example, the UEs 115 may not be included in dual radio devices 215 and may otherwise operate in a standalone capacity (not shown).

The wireless communications system 200 may include resources sets 205 (e.g., resource pools), which may include resources 210 for communications between wireless devices (e.g., UEs 115, dual radio devices 215). Each resource set 205 may include different types of resources 210. For example, a resource set 205 may include one or more resources 210-*a* (e.g., one or more LTE slots), one or more resources 210-*b* (e.g., one or more NR slots), and one or more resources 210-*c* (e.g., one or more slots with NR PSFCH resources). In some cases, a resource set 205 may be configured statically (e.g., based on various combinations or percentages of wireless devices within the wireless communications system 200 that communicate using respective RATs). For example, the resource set 205-*a* may be utilized in wireless communications systems 200 that include relatively higher quantities of NR wireless devices when compared to the resource set 205-*b*, which may be utilized in wireless communications systems 200 that include relatively lower quantities of NR wireless devices.

The wireless communications system may include a communication link 220, which may be an example of a communication link 125, as described with reference to FIG. 1. In some cases, the dual radio device 215-*a* may communicate with the dual radio device 215-*b* via the communication link 220. For example, the dual radio device 215-*a* may transmit, to the dual radio device 215-*b*, via the communication link 220, one or more sidelink messages on one or more resources 210 (e.g., from one or more resource sets 205). As described herein, communications between dual radio devices 215 may include signaling between any combination of UEs 115. For example, the UE 115-*a* may communicate with the UE 115-*c*, the UE 115-*d*, or both (e.g., via the communication link 220). Additionally, or alternatively, the UE 115-*b* may communicate with the UE 115-*c*, the UE 115-*d*, or both (e.g., via the communication link 220). As such, communications between UEs 115 may be described more generally as communications between dual radio devices 215 or communications between wireless devices.

In some cases, UEs 115 within a dual radio device 215 may communicate with each other. Such communications may be performed wirelessly (e.g., via a communication link 125 (not shown)) or via any other type of coupling, such as one or more wired channels. For example, the UE 115-*a* and the UE 115-*b* may be electrically coupled via one or more wired channels and may communicate via the one or more wired channels. Similarly, the UE 115-*c* and the UE 115-*d* may communicate via one or more wireless channels or via one or more wired channels. In such cases, UEs 115 within a dual radio device 215 may share one or more resource sets 205 (e.g., one or more common resource pools). Although FIG. 2 shows one illustrative example of UEs 115 within respective dual radio devices 215, UEs 115 may be examples of co-located UEs 115, which may or may not be included in a dual radio device 215. For example, the UE 115-*a* and the UE 115-*b* may be examples of co-located UEs 115. Additionally, or alternatively, the UE 115-*c* and the UE 115-*d* may be examples of co-located UEs 115. Accordingly, the techniques described herein may apply to UEs 115 that operate in a standalone capacity (e.g., UEs 115 not included in dual radio devices 215). For example, a UE 115 not included in a dual radio device 215 may perform resource selection techniques as described herein.

In some cases, dual radio devices 215 may be examples of NR-enabled vehicle-to-everything (V2X) wireless devices (e.g., NR-enabled vehicles). Such wireless devices may be capable of performing communications using NR (e.g., via the UE 115-*a*) and using LTE (e.g., via the UE 115-*b*). Although generally described herein as UEs 115, the UE 115-*a* may be an example of an NR transceiver (e.g., an NR radio) and the UE 115-*b* may be an example of an LTE transceiver (e.g., an LTE radio). Additionally, or alternatively, the UE 115-*c* may be example of an NR transceiver and the UE 115-*d* may be an example of an LTE transceiver. In some cases, a dual radio device 215 may communicate basic safety message (BSM) and cooperative awareness message (CAM) packets using LTE and may communicate sensor sharing and other types of packets using NR.

In some cases, due to limited availability of the RF spectrum, NR wireless devices (e.g., the UE 115-*a* and the UE 115-*c*) and LTE wireless devices (e.g., the UE 115-*b* and the UE 115-*d*) may operate in a same channel. For example, NR wireless devices and LTE wireless devices may communicate using the same or partially overlapping resources 210 (e.g., frequency resources, time resources, or both). In the absence of a coordination mechanism (e.g., a protocol for coordinating resources 210), communications between NR wireless devices and LTE wireless devices may collide (e.g., due to occupying the same or partially overlapping resources 210). In such cases, performance for both NR wireless devices and LTE wireless devices may be degraded.

In some cases, resource sets 205 (e.g., frame structures) may be configured statically to accommodate specific compositions (e.g., percentages, fractions, mixes) of wireless devices (e.g., within a coverage area). Such configurations may enable NR wireless devices to access a channel (e.g., communicate via a channel) in a first set of slots (e.g., time slots, resources 210) and may enable LTE wireless devices to access the channel in a second set of slots, where the first set of slots and the second set of slots are both statically configured. However, resource sets 205 that are statically configured (e.g., that are not updated based on various conditions) may present challenges (e.g., if the frame structure is not fully adopted for wireless devices using different RATs). For example, some LTE wireless devices may operate according to protocols that are not anticipated to change or be updated. Additionally, or alternatively, such static configurations may not account for an NR penetration rate increasing over time (e.g., due to the frame structure being static). Additionally, or alternatively, such configurations may not evolve based on network conditions (e.g., based on changes in traffic for NR and LTE), which may degrade performance for wireless devices.

In accordance with examples as described herein, wireless devices may dynamically share a resource set 205 (e.g., a resource set 205 may be updated dynamically to accommodate multiple wireless devices using different RATs). For example, a wireless device, such as the UE 115-*a*, may receive resource availability information (e.g., LTE reservation information, candidate information) from the UE 115-*b* (e.g., a co-located LTE wireless device) and may select resources 210 for performing NR communications based on the received resource availability information. For example, when performing a resource 210 selection procedure in the physical layer, the UE 115-*a* may exclude resources from its own candidate resource set 205 based on the received resource availability information (e.g., information that indicates resources are allocated or utilized for LTE communications).

In some cases, the UE 115-*a* may use LTE reservation information to determine a set of available transmission resources (e.g., to determine resources 210-*b*). In such cases, the UE 115-*a* may determine an LTE channel occupancy (e.g., a fraction of time that a channel is occupied for LTE, a ratio of LTE resources to NR resources within a resource set 205). The UE 115-*a* may begin with an initial set of available transmission resources (e.g., including resources 210-*b*, resources 210-*c*, or both). The UE 115-*a* may then monitor for and aggregate LTE control information (e.g., that indicates the LTE channel occupancy) over a period of time (e.g., a time window, Twin) and update the initial set of available transmission resources based on the LTE control information (e.g., based on updated LTE channel occupancy). For example, the UE 115-*a* may re-assign resources 210 (e.g., remove resources 210 from a resource set 205, or add resources 210 to a resource set 205) based on the LTE control information. In such cases, the UE 115-*a* may map LTE channel occupancy and NR availability to a resource set 205 (e.g., the UE 115-*a* may configure a resource set 205 that accounts for LTE channel occupancy and NR availability) so that the UE 115-*a* may effectively select resources 210-*b* or resources 210-*c* for NR communications while avoiding resources 210-*a*. Additional details for determining transmission resources are further described with reference to FIG. 3.

As described herein, the resource sets 205 may illustrate an example of dynamic resource configuration where the resource set 205-*b* is established (e.g., selected by the UE 115-*a*) by modifying or otherwise updating the resource set 205-*a* based on channel occupancy for a given RAT. For example, the UE 115-*a* may initially select the resource set 205-*a* or may otherwise receive an indication of the resource set 205-*a*. A portion (e.g., 35%) of resources 210 in the resource set 205-*a* may be for NR communications. The UE 115-*a* may receive signaling (e.g., from the UE 115-*b*) indicating that a portion of resources 210 are for LTE (e.g., an indication of an LTE channel occupancy). The UE 115-*a* may then update the resource set 205-*a* to account for the portion of resources 210 indicated by the received signaling. For example, the UE 115-*a* may re-allocate two resources 210 for LTE, as shown by the resource set 205-*b*. Accordingly, a first portion (e.g., 25%) of resources 210 in the resource set 205-*b* may be for NR communications and a second portion (e.g., 75%) of the resources 210 in the resource set 205-*b* may be for LTE communications. In such cases, updating a resource set 205 based on channel occupancy information may result in improved communication reliability because the UE 115-*a* may appropriately allocate resources 210-*a* for LTE communications and thus avoid transmitting overlapping NR communications (e.g., on the resources 210-*a*).

Figure 3:
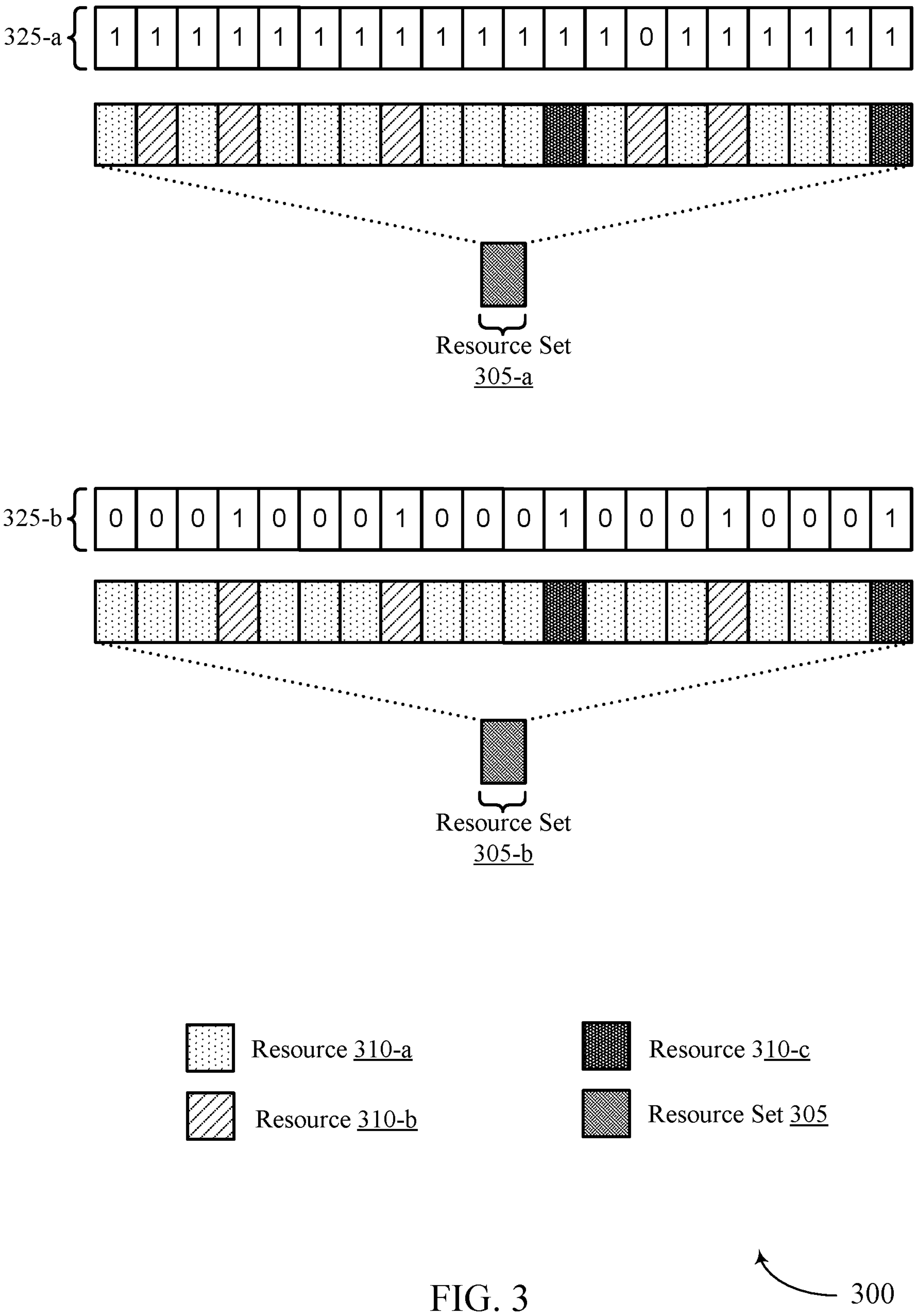
FIG. 3 illustrates an example of a bitmap configuration that supports sidelink resource selection schemes for coexistence of multiple radio access technologies in accordance with one or more aspects of the present disclosure.

FIG. 3 illustrates examples of a bitmap configuration 300 that supports sidelink resource selection schemes for coexistence of multiple radio access technologies in accordance with one or more aspects of the present disclosure. The bitmap configuration 300 may be implemented by one or more aspects of the wireless communications system 100 or the wireless communications system 200. For example, one or more wireless devices, such as a UE 115, a network entity 105, or a dual radio device 215, as described with reference to FIGS. 1-2, may implement the bitmap configuration 300. The bitmap configuration 300 may include the resource set 305-*a* and the resource set 305-*b*, which may be examples of corresponding resource sets 205 as described with reference to FIG. 2. The bitmap configuration 300 may also include resources 310-*a*, resources 310-*b*, and resources 310-*c*, which may be examples of corresponding resources 210 as described with reference to FIG. 2. As described herein, the bitmap configuration 300 may include bitmaps 325, which may be utilized for indicating resources 310 that are available for communications using specific RATs.

For a given resource set 305 (e.g., resource pool) an NR wireless device may be configured (e.g., preconfigured) with a bitmap 325 that corresponds to the resource set 305. For example, the bitmap 325-*a* may correspond to the resource set 305-*a* and the bitmap 325-*b* may correspond to the resource set 305-*b*. The bitmap 325-*a* may have a length, $L_0$, and may include a quantity of bits (e.g., $b_0$, $b_1$, $b_2$, . . . , $b_{L_0-1}$). Each bit of the bitmap 325-*a* may indicate one or more resources 310 (e.g., time resources, frequency resources, time-frequency resources) that the NR wireless device may use for standalone NR operation (e.g., standalone NR sidelink operation, operation without consideration of LTE communications).

The NR wireless device may determine (e.g., estimate) a fraction, α, of resources 210 (e.g., a percentage, a ratio) that are allocated for LTE communications. The NR wireless device may determine the fraction based on information received from a co-located wireless device (e.g., an LTE wireless device). For example, the co-located wireless device may transmit an indication of the fraction to the NR wireless device. Additionally, or alternatively, the NR wireless device may determine the fraction without receiving the indication from another wireless device. For example, the NR wireless device may perform one or more sensing (e.g., monitoring) operations to determine the fraction. Based on determining the fraction, the NR wireless device may determine a subset of resources 310 for NR communications (e.g., resources 310 that are not allocated to LTE based on the fraction). In some cases, the subset of resources 310 may include each resource 310-*c* (e.g., each slot with one or more sidelink feedback channel resources). In some cases, the subset of resources 310 for NR communications may be represented as or indicated by the bitmap 325-*b* (e.g., a dynamic coexistence bitmap). The bitmap 325-*b* may have a length, $L_1$, and may include a quantity of bits $$\left(\text{e.g., } b_0^{coex}, b_1^{coex}, b_2^{coex}, \ldots, b_{L_1-1}^{coex}\right).$$

In some cases, $L_1$ and $L_0$ may have a known and fixed relationship to each other (e.g., $L_1=L_0$, $\text{mod}(L_0, L_1)=0$). In some cases, the subset of resources 310 for NR communications may be indicated by a set of periodically repeating slot indices. For example, the modulo operator may be used to determine if resources 310 (e.g., in a slot) may be used for NR sidelink communications (e.g., $T_{TTI}$ mod $k=n_i$, $i=0, \ldots, k-1$).

In some cases, an NR wireless device may select a resource 310 (e.g., for NR communications) if a bit associated with the resource 310 is set to a logic state "1" in both the bitmap 325-*a* and the bitmap 325-*b*. Additionally, or alternatively, the NR wireless device may update a resource set 305 to reflect available resources as indicated by both the bitmap 325-*a* and the bitmap 325-*b*. For example, the resource set 305-*b* may be an example of the resource set 305-*a* after the NR wireless device updates the resource set 305-*a* based on both the bitmap 325-*a* and the bitmap 325-*b*. In such cases, the NR wireless device may allocate resources 310 for NR communications if both a first corresponding bit in the bitmap 325-*a* and a second corresponding bit in the bitmap 325-*b* indicate a logic state "1." Additionally, or alternatively, the NR wireless device may determine to use the one or more resources 310 based on sensing results (e.g., whether the NR wireless device detects LTE communications on the one or more resources 310). In some cases, one or more bitmaps 325 (e.g., the bitmap 325-*a*, the bitmap 325-*b*, or both) may be used to indicate resources 310 for transmitting communications and not receiving communications. For example, an NR wireless device may receive communications (e.g., on one or more physical layer resources) irrespective of the bitmap 325-*b*.

An NR wireless device may update the bitmap 325-*b*. In some cases, the NR wireless device may update the bitmap 325-*b* periodically with a fixed period (e.g., every five seconds). In some cases, the fixed period may be configured (e.g., preconfigured) at the NR wireless device (e.g., by a network entity 105). For example the NR wireless device may receive an indication of the fixed period. In some cases, the NR wireless device may update the bitmap 325-*b* based on a trigger event or a combination of trigger events. Examples of trigger events may include, receiving a trigger for resource reselection for data transmission, a change in the value of the fraction, α, a change in traffic intensity (e.g., a quantity of communications received during a time window), or a change in a quality of service (e.g., if communication quality at the NR wireless device changes). In some cases, the NR wireless device may update the bitmap 325-*b* based on an indication received from higher layers or a network entity 105.

In some cases, the NR wireless device may select resources 310 based on receiving a trigger (e.g., a message that triggers selection of resources 310). For example, the NR wireless device may impose a restriction on sidelink transmission resources when a trigger for resource selection is received. In some cases, resource selection triggers may be communicated on a per-packet basis. For example, the NR wireless device may receive a resource selection trigger for a single packet. Such techniques for selecting resources 310 in response to receiving a trigger may be performed in conjunction with or as an alternative to the described techniques for selecting resources 310 using one or more bitmaps 325. For example, the NR wireless device may receive a trigger and determine to select resources without using a bitmap 325 or using a single bitmap 325.

In some cases, an NR wireless device may update the value of the fraction, α, either periodically or when the trigger for resource selection is received. The NR wireless device may receive the trigger from any other wireless device, such as an LTE wireless device or a network entity 105. When the trigger for resource selection or reselection for a packet is received, the NR wireless device may determine a resource set 305-*a* (e.g., a set of resources, $S_A$) for possible transmission of the packet. Based on a current estimate of the fraction, α, the NR wireless device may exclude resources from the resource set 305-*a*, which may create the resource set 305-*b* (e.g., an updated set of resources, $$S_A^{coex}).$$

In some cases, the resource set 305-*b* may include each resource 310-*c* in the resource set 305-*a*.

The resource set 305-*b* may be determined (e.g., by the NR wireless device) by mapping the fraction, α, to a bitmap 325 indicating resources to be included or excluded for NR communications. Additionally, or alternatively, the resource set 305-*b* may be determined by mapping the fraction, α, to a set of periodically repeating NR transmission resource sets 305. The bitmap 325 may be available at the NR wireless device as a preconfigured bitmap 325 or as a look up table. In some cases, the NR wireless device may further exclude resources from the resource set 305-*b* based on decoded control information (e.g., decoded NR sidelink control information) or other sensing information (e.g., NR sidelink sensor information communicated via constant bit rate (CBR)). In some cases, the bitmap 325 may be associated with a reference resource (e.g., a reference time slot, a reference system frame). For example, a reference resource (e.g., a single resource 310) may be utilized for synchronizing or otherwise mapping the bitmap 325 to a respective resource set 305.

Figure 4:
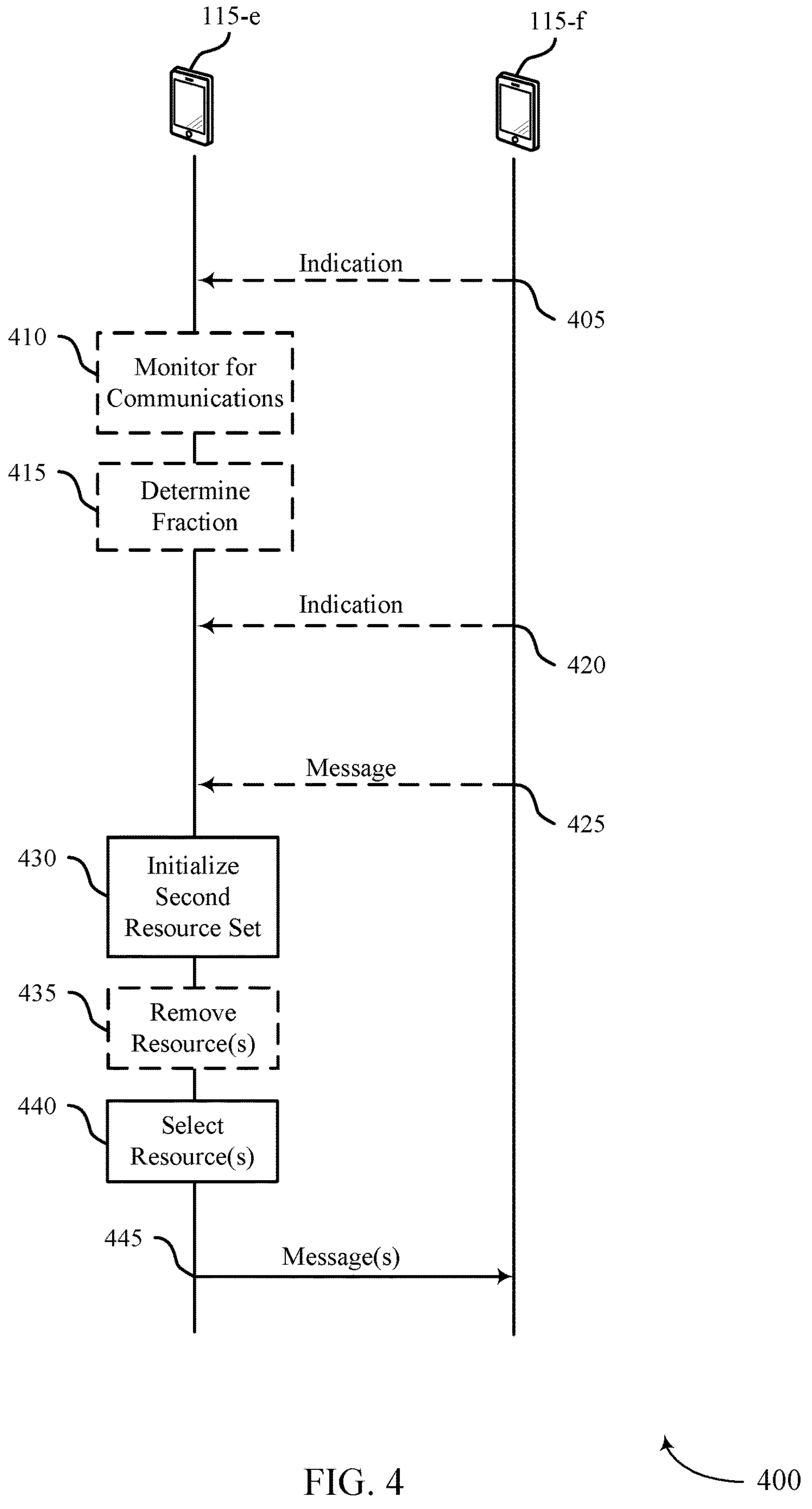
FIG. 4 illustrates an example of a process flow that supports sidelink resource selection schemes for coexistence of multiple radio access technologies in accordance with one or more aspects of the present disclosure.

FIG. 4 illustrates an example of a process flow 400 that supports sidelink resource selection schemes for coexistence of multiple radio access technologies in accordance with one or more aspects of the present disclosure. In some cases, the process flow 400 may implement aspects of the wireless communications system 100, the wireless communications system 200, or the bitmap configuration 300. For example, the process flow 400 may include a UE 115-*e*, which may be an example of the UE 115-*a*, and a UE 115-*f* which may be example of the UE 115-*b* as described with reference to FIG. 2. Additionally, or alternatively, the UE 115-*e* and the UE 115-*f* may communicate using one or more aspects of a bitmap configuration 300, as described with reference to FIG. 3. In some cases, the UEs 115 may perform a resource selection process that accounts for resources allocated to multiple RATs, which may improve communications between the UEs 115.

In the following description of the process flow 400, the operations between the UE 115-*e*, the UE 115-*f* may be performed in a different order than the order shown. Some operations may also be left out of the process flow 400, or other operations may be added to the process flow 400. Further, although some operations or communications may be shown to occur at different times for discussion purposes, these operations may occur at the same time. Additionally, or alternatively, although the UE 115-*e*, the UE 115-*f* are shown performing a number of the operations of process flow 400, any wireless device may perform the operations shown, such as a dual radio device 215 or a network entity 105.

At 405, the UE 115-*e* may receive, from the UE 115-*f*, for a wireless channel that supports coexistence of first sidelink communications using a first RAT (e.g., NR) and second sidelink communications using a second RAT (e.g., LTE), an indication of a first set of resources that are available for communications using the first RAT and the second RAT (e.g., an indication of a resource pool that is shared between LTE wireless devices and NR wireless devices). The indication may be included in any type of message or signaling (e.g., sidelink signaling) between the UE 115-*e* and the UE 115-*f*. In some cases, the indication may include a first bitmap (e.g., a bitmap 325-*a*) that indicates a first set of resources that are available for communications using the first RAT and the second RAT.

At 410, the UE 115-*e* may monitor the wireless channel for the communications using the first RAT. In some cases, the UE 115-*e* may monitor the wireless channel for sidelink communications (e.g., using the first RAT) within a coverage area (e.g., of the UE 115-*e*). In some cases, the UE 115-*e* may receive communications from the UE 115-*f* based on monitoring the wireless channel. Additionally, or alternatively, the UE 115-*e* may receive communications from other UEs 115 (not shown). In some cases, the UE 115-*f* may operate using the second RAT and the UE 115-*e* may operate using the first RAT. Although the process flow 400 illustrates one example of the UE 115-*e* monitoring for communications (e.g., at 410) using the second RAT, the UE 115-*e* may monitor for communications (e.g., using the first RAT, using the second RAT, or both) at any other time, such as prior to 410, or continuously throughout the process flow 400.

At 415, the UE 115-*e* may determine a fraction (e.g., a value of a fraction) of the first set of resources that are reserved for the communications using the second RAT. The UE 115-*e* may determine the fraction based on the monitoring. For example, the UE 115-*e* may receive communications using the second RAT while monitoring for the communications using the second RAT and may determine the fraction with respect to the communications received while monitoring. In some cases, the UE 115-*e* may initialize a second set of resources based on the fraction or based on logic states indicated by the first bitmap and a second bitmap (e.g., the bitmap 325-*b*). In such cases, the logic states indicated by the first bitmap, the second bitmap, or both, may correspond to the fraction. In some cases, the UE 115-*e* may identify, allocate, or select the second set of resources based on the fraction. In some cases, the second set of resources may be for communications using the first RAT.

At 420, the UE 115-*e* may receive, from the UE 115-*f*, an indication of the fraction of the first set of resources that are reserved for the communications using the second RAT. In such cases, the indication may be received by the UE 115-*e* as an alternative to the UE 115-*e* determining the fraction (e.g., without receiving an indication). In some cases, the fraction may be based on usage information. For example, the fraction may be determined (e.g., by the UE 115-*e*) based on channel usage information for the UE 115-*f*. Additionally, or alternatively, the fraction may be an example of or otherwise indicate the usage information. In some cases, the indication of the fraction may be associated with a traffic priority value. In some cases, the UE 115-*e* may update the usage information according to a defined periodicity or a fixed duration prior to data transmission. Additionally, or alternatively, the UE 115-*e* may update the usage information based on one or more of a change in one or more network conditions (e.g., a quantity of UEs 115 using the second RAT within a coverage area for the UE 115-*e*), a received indication to update the usage information (e.g., from the UE 115-*e*), or both. In some cases, the indication of the fraction of the first set of resources that are reserved for the communications using the second RAT may be an indication to update the usage information. That is, the indication of the fraction may trigger the UE 115-*e* to update the usage information.

At 425, the UE 115-*e* may receive, from the UE 115-*f* or a network entity 105 (not shown), a message triggering resource selection by the UE 115-*e*. In some cases, initializing the second set of resources is based on receiving the message. Additionally, or alternatively, the message may indicate a configuration for resource selection. For example, the message may indicate a configuration that specifies a type of resource selection or a protocol for resource selection. The UE 115-*e* may receive the message and may accordingly select resources based on the configuration. Additionally, or alternatively, the message triggering resource selection may indicate whether the UE 115-*e* updates the fraction of the first set of resources that are reserved for the communications using the second RAT periodically or in response to a received indication to update the fraction.

At 430, the UE 115-*e* may initialize for at least transmitting one or more sidelink messages (e.g., to the UE 115-*f*) using the first RAT, a second set of resources. The second set of resources may include a subset of the first set of resources. Additionally, or alternatively, the second set of resources may be based on usage information for the second RAT on the wireless channel. In some cases, the second set of resources includes one or more resources in a time window based on a resource selection trigger associated with the first set of resources and a bitmap (e.g., the bitmap 325-*a*, the bitmap 325-*b*, or both) indicating availability of the one or more resources. In some cases, each bit of the bitmap indicates whether a respective time frequency resource is available for the communications associated with the first RAT. In some cases, each bit of the bitmap is mapped to the fraction (e.g., a resource usage fraction value). In some cases, initializing the second set of resources is based on one or more periodically repeating slot indices.

At 435, the UE 115-*e* may remove one or more resources from the second set of resources based on control information received at the UE 115-*e* (e.g., using the first RAT). For example, the UE 115-*e* may receive control information from the UE 115-*f* and the control indication may indicate one or more resources to be removed from the second set of resources. In some cases, the one or more resources indicated for removal may be resources allocated for communications using the second RAT. In some cases, the UE 115-*e* may remove one or more resources from the second set of resources based on sensor information (e.g., of the UE 115-*e*). For example, the UE 115-*e* may detect (e.g., via one or more sensors of the UE 115-*e*) that one or more resources is allocated for communications using the second RAT and may accordingly remove the one or more resources from the second set of resources. In some cases, the UE 115-*e* may remove one or more resources from the second set of resources based on a combination of control information received at the UE 115-*e* (e.g., using the first RAT) and sensor information.

At 440, the UE 115-*e* may select, for transmitting the one or more sidelink messages using the first RAT, one or more resources from the second set of resources. The selected one or more resource may include one or more resources allocated for communications using the first RAT. In some cases, the one or more resources may be indicated by the first bitmap, the second bitmap, or both. For example, one or more bitmaps may indicate that the one or more resources are available for communications using the first RAT, the second RAT, or both. At 445, the UE 115-*e* may transmit, to the UE 115-*f*, the one or more sidelink messages using the first RAT and the one or more resources from the second set of resources.

Figure 5:
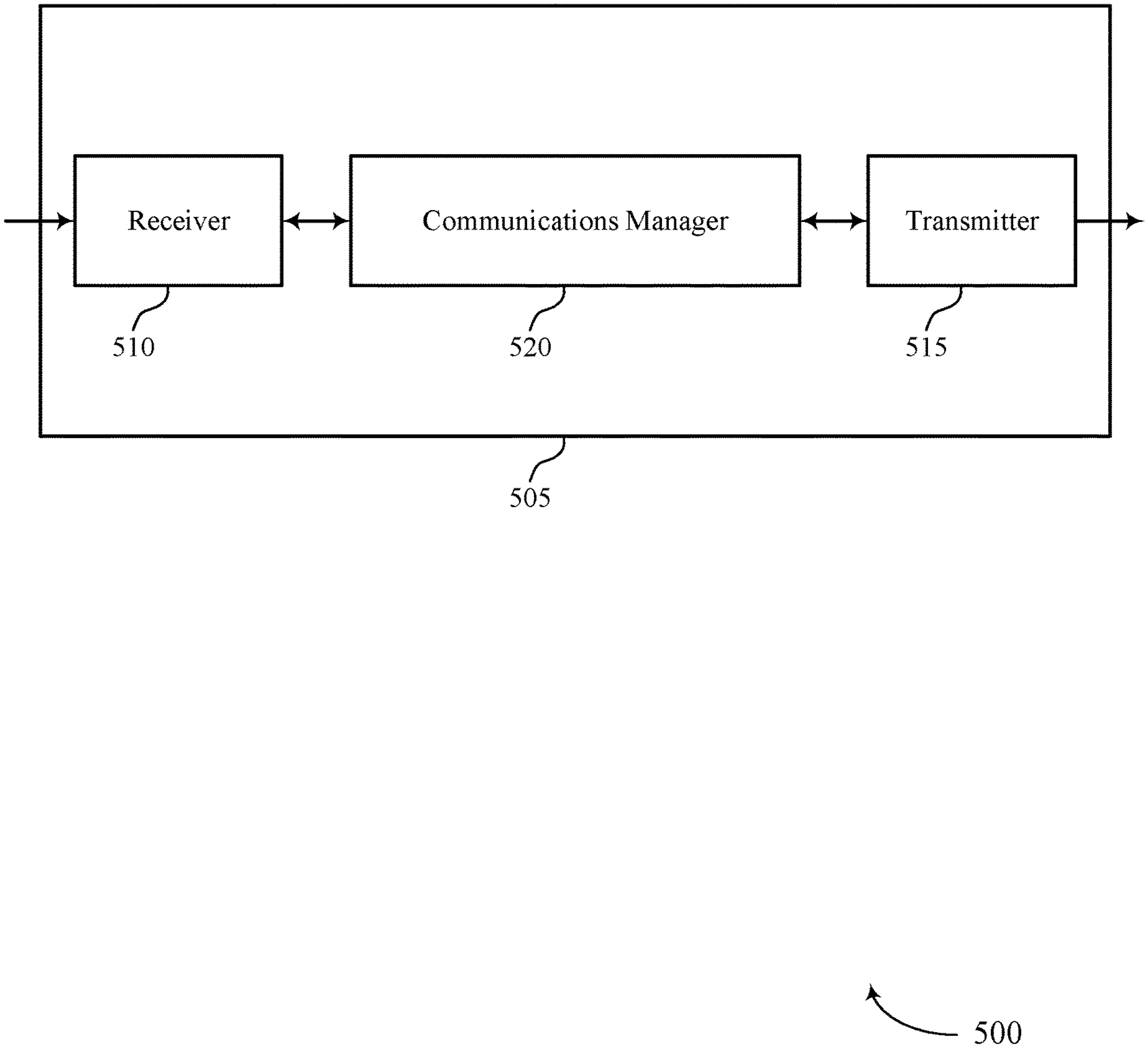
FIGS. 5 and 6 illustrate block diagrams of devices that support sidelink resource selection schemes for coexistence of multiple radio access technologies in accordance with one or more aspects of the present disclosure.

FIG. 5 illustrates a block diagram 500 of a device 505 that supports sidelink resource selection schemes for coexistence of multiple radio access technologies in accordance with one or more aspects of the present disclosure. The device 505 may be an example of aspects of a UE 115 as described herein. The device 505 may include a receiver 510, a transmitter 515, and a communications manager 520. The device 505 may also include one or more processors. Each of these components may be in communication with one another (e.g., via one or more buses).

The receiver 510 may provide a means for receiving information such as packets, user data, control information, or any combination thereof associated with various information channels (e.g., control channels, data channels, information channels related to sidelink resource selection schemes for coexistence of multiple radio access technologies). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to sidelink resource selection schemes for coexistence of multiple radio access technologies). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of sidelink resource selection schemes for coexistence of multiple radio access technologies as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include one or more processors, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, one or more processors and memory coupled with the one or more processors may be configured to perform one or more of the functions described herein (e.g., by executing, by the one or more processors, instructions stored in the memory).

Additionally, or alternatively, in some examples, the communications manager 520, the receiver 510, the transmitter 515, or various combinations or components thereof may be implemented in code (e.g., as communications management software or firmware) executed by one or more processors. If implemented in code executed by one or more processors, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

For example, the communications manager 520 may be configured as or otherwise support a means for receiving, for a wireless channel associated with coexistence of first sidelink communications associated with a first RAT and second sidelink communications associated with a second RAT, an indication of a first set of resources that are available for communications associated with the first RAT and communications associated with the second RAT. The communications manager 520 may be configured as or otherwise support a means for initializing, for at least transmitting one or more sidelink messages using the first RAT, a second set of resources, the second set of resources including a subset of the first set of resources, where the second set of resources is based on usage information for the second RAT on the wireless channel. The communications manager 520 may be configured as or otherwise support a means for selecting, for transmitting the one or more sidelink messages using the first RAT, one or more resources from the second set of resources. The communications manager 520 may be configured as or otherwise support a means for transmitting the one or more sidelink messages using the first RAT and the one or more resources from the second set of resources.

By including or configuring the communications manager 520 in accordance with examples as described herein, the device 505 (e.g., one or more processors controlling or otherwise coupled with the receiver 510, the transmitter 515, the communications manager 520, or a combination thereof) may support techniques for more efficient utilization of communication resources. For example, the device 505 may perform one or more operations to effectively allocate communication resources to different RATs, which may improve communication quality and reduce retransmissions due to interference.

Figure 6:
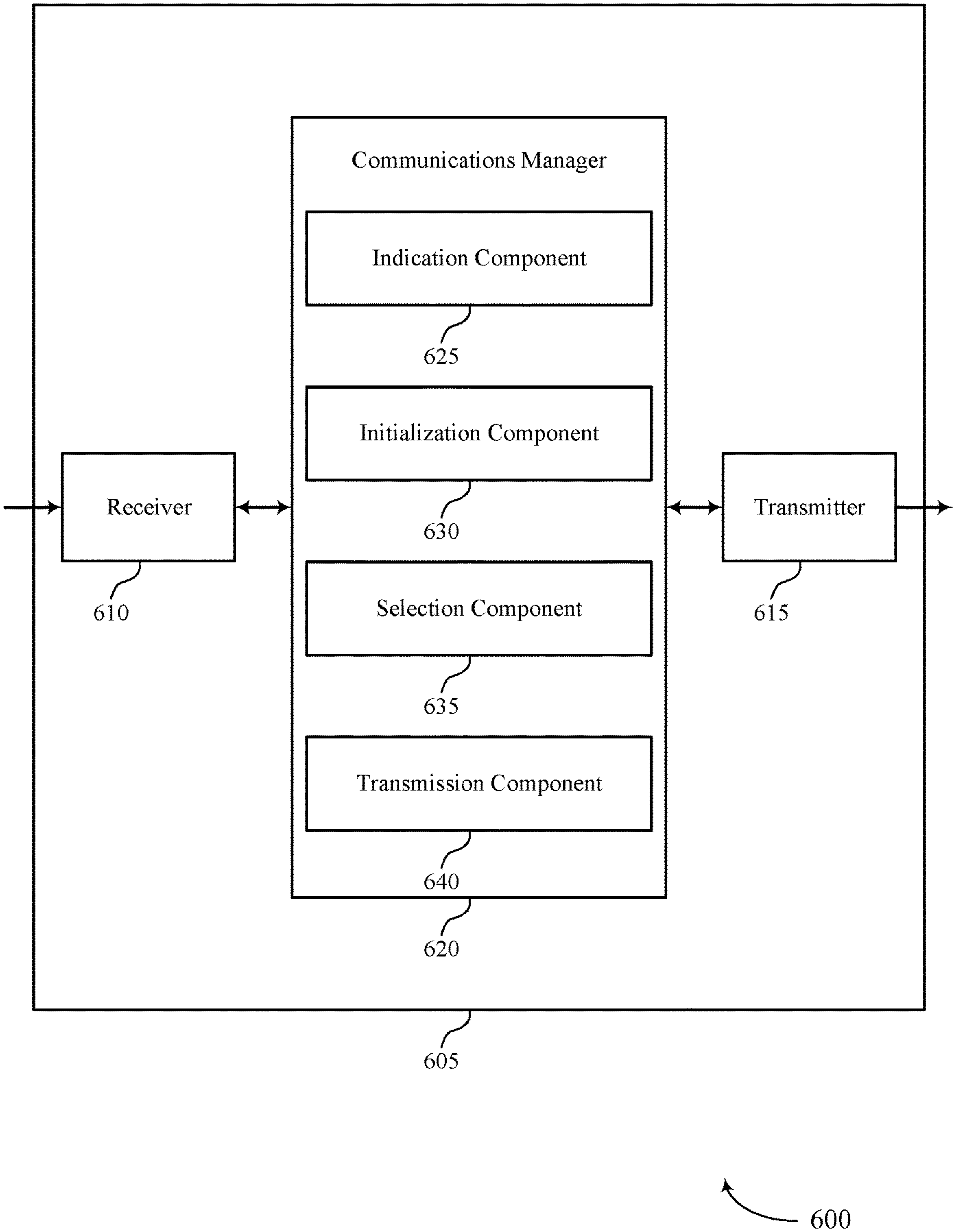

FIG. 6 illustrates a block diagram 600 of a device 605 that supports sidelink resource selection schemes for coexistence of multiple radio access technologies in accordance with one or more aspects of the present disclosure. The device 605 may be an example of aspects of a device 505 or a UE 115 as described herein. The device 605 may include a receiver 610, a transmitter 615, and a communications manager 620. The device 605 may also include one or more processors. Each of these components may be in communication with one another (e.g., via one or more buses).

The receiver 610 may provide a means for receiving information such as packets, user data, control information, or any combination thereof associated with various information channels (e.g., control channels, data channels, information channels related to sidelink resource selection schemes for coexistence of multiple radio access technologies). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to sidelink resource selection schemes for coexistence of multiple radio access technologies). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of sidelink resource selection schemes for coexistence of multiple radio access technologies as described herein. For example, the communications manager 620 may include an indication component 625, an initialization component 630, a selection component 635, a transmission component 640, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The indication component 625 may be configured as or otherwise support a means for receiving, for a wireless channel associated with coexistence of first sidelink communications associated with a first RAT and second sidelink communications associated with a second RAT, an indication of a first set of resources that are available for communications associated with the first RAT and communications associated with the second RAT. The initialization component 630 may be configured as or otherwise support a means for initializing, for at least transmitting one or more sidelink messages using the first RAT, a second set of resources, the second set of resources including a subset of the first set of resources, where the second set of resources is based on usage information for the second RAT on the wireless channel. The selection component 635 may be configured as or otherwise support a means for selecting, for transmitting the one or more sidelink messages using the first RAT, one or more resources from the second set of resources. The transmission component 640 may be configured as or otherwise support a means for transmitting the one or more sidelink messages using the first RAT and the one or more resources from the second set of resources.

Figure 7:
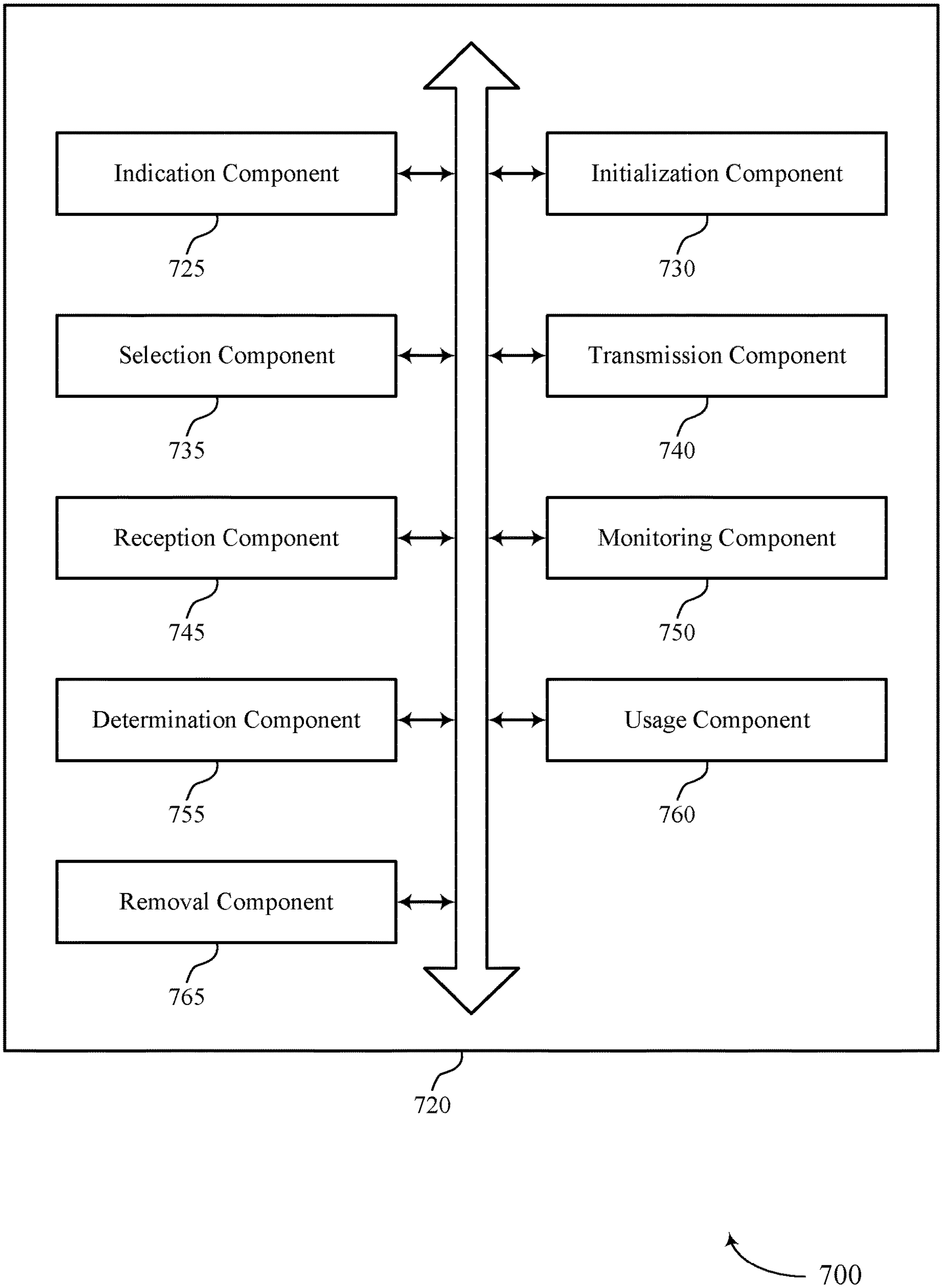
FIG. 7 illustrates a block diagram of a communications manager that supports sidelink resource selection schemes for coexistence of multiple radio access technologies in accordance with one or more aspects of the present disclosure.

FIG. 7 illustrates a block diagram 700 of a communications manager 720 that supports sidelink resource selection schemes for coexistence of multiple radio access technologies in accordance with one or more aspects of the present disclosure. The communications manager 720 may be an example of aspects of a communications manager 520, a communications manager 620, or both, as described herein. The communications manager 720, or various components thereof, may be an example of means for performing various aspects of sidelink resource selection schemes for coexistence of multiple radio access technologies as described herein. For example, the communications manager 720 may include an indication component 725, an initialization component 730, a selection component 735, a transmission component 740, a reception component 745, a monitoring component 750, a determination component 755, a usage component 760, a removal component 765, or any combination thereof. Each of these components may communicate, directly or indirectly, with one another (e.g., via one or more buses).

The indication component 725 may be configured as or otherwise support a means for receiving, for a wireless channel associated with coexistence of first sidelink communications associated with a first RAT and second sidelink communications associated with a second RAT, an indication of a first set of resources that are available for communications associated with the first RAT and communications associated with the second RAT. The initialization component 730 may be configured as or otherwise support a means for initializing, for at least transmitting one or more sidelink messages using the first RAT, a second set of resources, the second set of resources including a subset of the first set of resources, where the second set of resources is based on usage information for the second RAT on the wireless channel. The selection component 735 may be configured as or otherwise support a means for selecting, for transmitting the one or more sidelink messages using the first RAT, one or more resources from the second set of resources. The transmission component 740 may be configured as or otherwise support a means for transmitting the one or more sidelink messages using the first RAT and the one or more resources from the second set of resources.

In some examples, the reception component 745 may be configured as or otherwise support a means for receiving an indication of a fraction of the first set of resources that are reserved for the communications associated with the second RAT, where the usage information includes the fraction and where the indication of the fraction is associated with a traffic priority value.

In some examples, the monitoring component 750 may be configured as or otherwise support a means for monitoring the wireless channel for the communications associated with the first RAT. In some examples, the determination component 755 may be configured as or otherwise support a means for determining a fraction of the first set of resources that are reserved for the communications associated with the second RAT based on the monitoring, where initializing the second set of resources is based on the fraction.

In some examples, the reception component 745 may be configured as or otherwise support a means for receiving a message triggering resource selection by the UE, where initializing the second set of resources is based on receiving the message.

In some examples, the usage component 760 may be configured as or otherwise support a means for updating the usage information for the second RAT on the wireless channel according to a defined periodicity or a fixed duration prior to data transmission.

In some examples, the usage component 760 may be configured as or otherwise support a means for updating the usage information based on one or more of: a change in one or more network conditions, a received indication to update the usage information, or both.

In some examples, the second set of resources includes one or more resources in a time window based on a resource selection trigger associated with the first set of resources and a bitmap indicating availability of the one or more resources.

In some examples, each bit of the bitmap indicates whether a respective time frequency resource is available for the communications associated with the first RAT.

In some examples, each bit of the bitmap is mapped to a resource usage fraction value.

In some examples, each bit of the bitmap is mapped to a traffic priority value.

In some examples, initializing the second set of resources is based on one or more periodically repeating slot indices.

In some examples, the removal component 765 may be configured as or otherwise support a means for removing one or more resources from the second set of resources based on one or more of: control information received at the UE (e.g., using the first RAT), sensor information, or a combination thereof.

Figure 8:
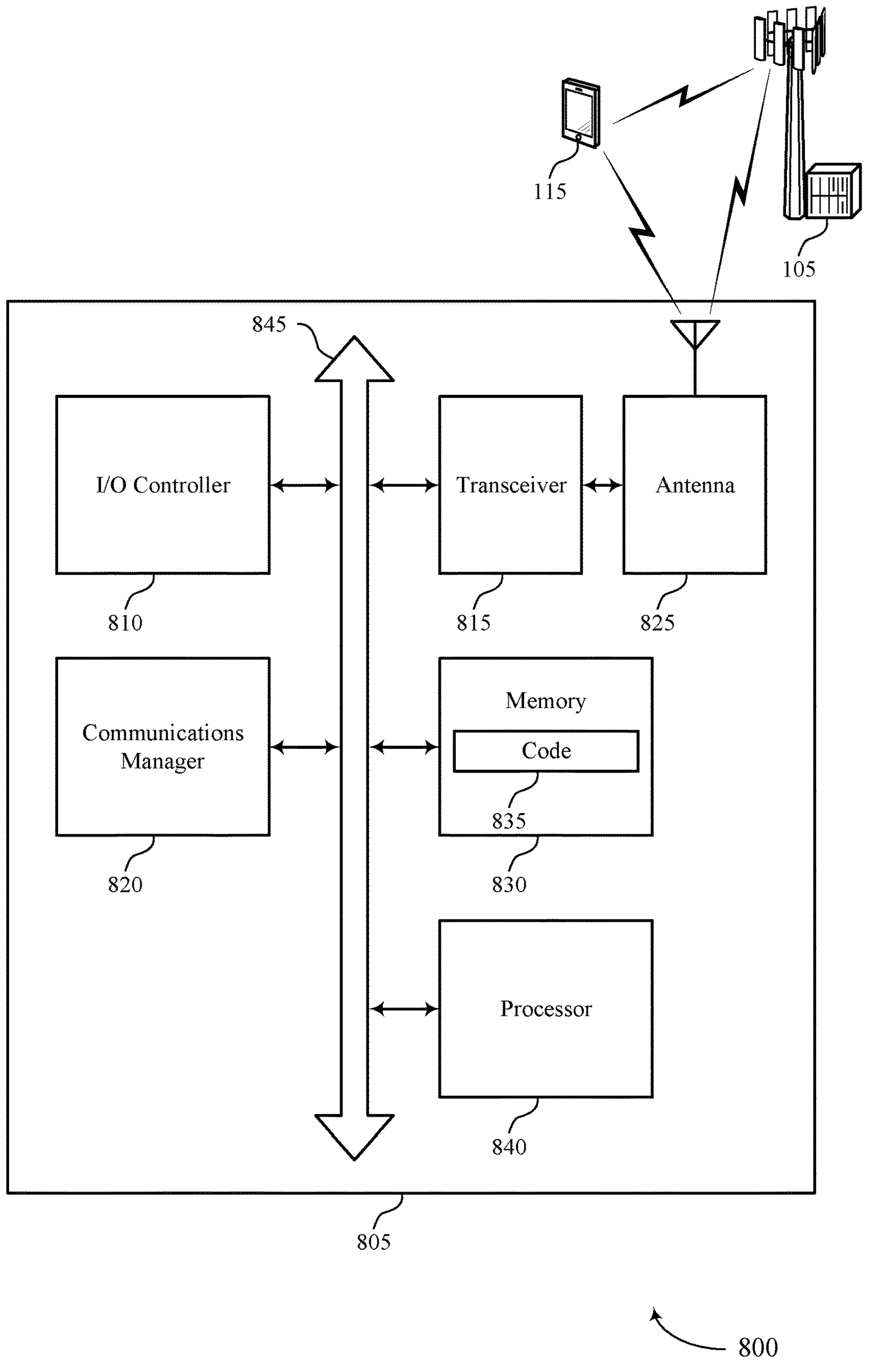
FIG. 8 illustrates a diagram of a system including a device that supports sidelink resource selection schemes for coexistence of multiple radio access technologies in accordance with one or more aspects of the present disclosure.

FIG. 8 illustrates a diagram of a system 800 including a device 805 that supports sidelink resource selection schemes for coexistence of multiple radio access technologies in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and one or more processors 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of one or more processors, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting sidelink resource selection schemes for coexistence of multiple radio access technologies). For example, the device 805 or a component of the device 805 may include a processor 840 and memory 830 coupled with or to the processor 840, the processor 840 and memory 830 configured to perform various functions described herein.

For example, the communications manager 820 may be configured as or otherwise support a means for receiving, for a wireless channel associated with coexistence of first sidelink communications associated with a first RAT and second sidelink communications associated with a second RAT, an indication of a first set of resources that are available for communications associated with the first RAT and communications associated with the second RAT. The communications manager 820 may be configured as or otherwise support a means for initializing, for at least transmitting one or more sidelink messages using the first RAT, a second set of resources, the second set of resources including a subset of the first set of resources, where the second set of resources is based on usage information for the second RAT on the wireless channel. The communications manager 820 may be configured as or otherwise support a means for selecting, for transmitting the one or more sidelink messages using the first RAT, one or more resources from the second set of resources. The communications manager 820 may be configured as or otherwise support a means for transmitting the one or more sidelink messages using the first RAT and the one or more resources from the second set of resources.

By including or configuring the communications manager 820 in accordance with examples as described herein, the device 805 may support techniques for improved communication reliability. For example, the device 805 may perform one or more operations to effectively allocate communication resources to different RATs, which may improve communication reliability and reduce interference between communications using different RATs.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of sidelink resource selection schemes for coexistence of multiple radio access technologies as described herein, or the processor 840 and the memory 830 may be otherwise configured to perform or support such operations.

Figure 9:
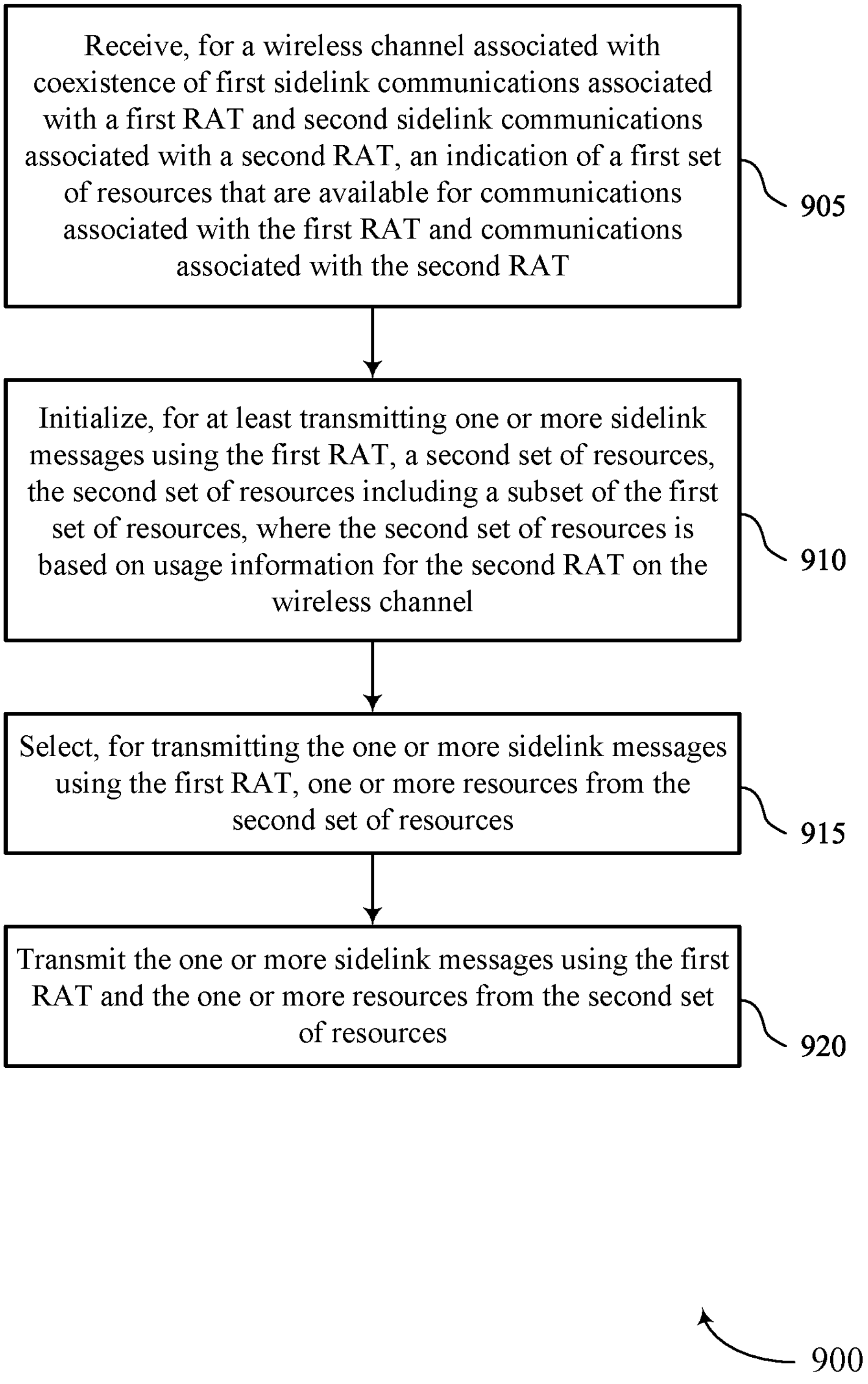
FIGS. 9 and 10 illustrate flowcharts showing methods that support sidelink resource selection schemes for coexistence of multiple radio access technologies in accordance with one or more aspects of the present disclosure.

FIG. 9 illustrates a flowchart showing a method 900 that supports sidelink resource selection schemes for coexistence of multiple radio access technologies in accordance with one or more aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 905, the method may include receiving, for a wireless channel associated with coexistence of first sidelink communications associated with a first RAT and second sidelink communications associated with a second RAT, an indication of a first set of resources that are available for communications associated with the first RAT and communications associated with the second RAT. The operations of 905 may be performed in accordance with examples as disclosed herein. In some examples, aspects of the operations of 905 may be performed by an indication component 725 as described with reference to FIG. 7.

At 910, the method may include initializing, for at least transmitting one or more sidelink messages using the first RAT, a second set of resources, the second set of resources including a subset of the first set of resources, where the second set of resources is based on usage information for the second RAT on the wireless channel. The operations of 910 may be performed in accordance with examples as disclosed herein. In some examples, aspects of the operations of 910 may be performed by an initialization component 730 as described with reference to FIG. 7.

At 915, the method may include selecting, for transmitting the one or more sidelink messages using the first RAT, one or more resources from the second set of resources. The operations of 915 may be performed in accordance with examples as disclosed herein. In some examples, aspects of the operations of 915 may be performed by a selection component 735 as described with reference to FIG. 7.

At 920, the method may include transmitting the one or more sidelink messages using the first RAT and the one or more resources from the second set of resources. The operations of 920 may be performed in accordance with examples as disclosed herein. In some examples, aspects of the operations of 920 may be performed by a transmission component 740 as described with reference to FIG. 7.

Figure 10:
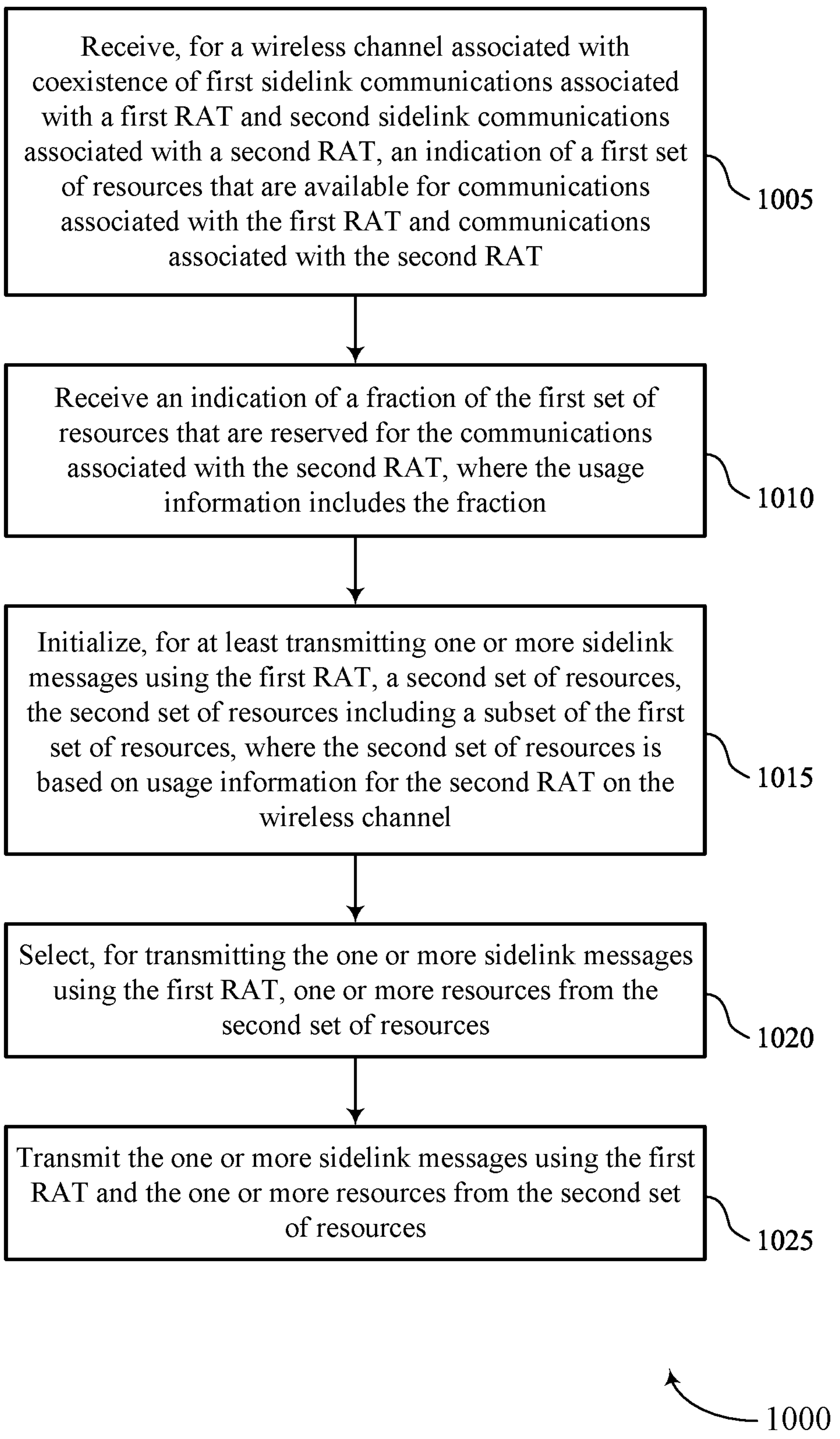

FIG. 10 illustrates a flowchart showing a method 1000 that supports sidelink resource selection schemes for coexistence of multiple radio access technologies in accordance with one or more aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1005, the method may include receiving, for a wireless channel associated with coexistence of first sidelink communications associated with a first RAT and second sidelink communications associated with a second RAT, an indication of a first set of resources that are available for communications associated with the first RAT and communications associated with the second RAT. The operations of 1005 may be performed in accordance with examples as disclosed herein. In some examples, aspects of the operations of 1005 may be performed by an indication component 725 as described with reference to FIG. 7.

At 1010, the method may include receiving an indication of a fraction of the first set of resources that are reserved for the communications associated with the second RAT, where the usage information includes the fraction and where the indication of the fraction is associated with a traffic priority value. The operations of 1010 may be performed in accordance with examples as disclosed herein. In some examples, aspects of the operations of 1010 may be performed by a reception component 745 as described with reference to FIG. 7.

At 1015, the method may include initializing, for at least transmitting one or more sidelink messages using the first RAT, a second set of resources, the second set of resources including a subset of the first set of resources, where the second set of resources is based on usage information for the second RAT on the wireless channel. The operations of 1015 may be performed in accordance with examples as disclosed herein. In some examples, aspects of the operations of 1015 may be performed by an initialization component 730 as described with reference to FIG. 7.

At 1020, the method may include selecting, for transmitting the one or more sidelink messages using the first RAT, one or more resources from the second set of resources. The operations of 1020 may be performed in accordance with examples as disclosed herein. In some examples, aspects of the operations of 1020 may be performed by a selection component 735 as described with reference to FIG. 7.

At 1025, the method may include transmitting the one or more sidelink messages using the first RAT and the one or more resources from the second set of resources. The operations of 1025 may be performed in accordance with examples as disclosed herein. In some examples, aspects of the operations of 1025 may be performed by a transmission component 740 as described with reference to FIG. 7.

The following provides an overview of aspects of the present disclosure:

Aspect 1: A method of wireless communications at a UE, comprising: receiving, for a wireless channel associated with coexistence of first sidelink communications associated with a first RAT and second sidelink communications associated with a second RAT, an indication of a first set of resources that are available for communications associated with the first RAT and communications associated with the second RAT; initializing, for at least transmitting one or more sidelink messages using the first RAT, a second set of resources, the second set of resources comprising a subset of the first set of resources, wherein the second set of resources is based at least in part on usage information for the second RAT on the wireless channel; selecting, for transmitting the one or more sidelink messages using the first RAT, one or more resources from the second set of resources; and transmitting the one or more sidelink messages using the first RAT and the one or more resources from the second set of resources.

Aspect 2: The method of aspect 1, further comprising: receiving an indication of a fraction of the first set of resources that are reserved for the communications associated with the second RAT, wherein the usage information comprises the fraction and wherein the indication of the fraction is associated with a traffic priority value.

Aspect 3: The method of aspect 1, further comprising: monitoring the wireless channel for the communications associated with the first RAT; and determining a fraction of the first set of resources that are reserved for the communications associated with the second RAT based at least in part on the monitoring, wherein initializing the second set of resources is based at least in part on the fraction.

Aspect 4: The method of any of aspects 1 through 3, further comprising: receiving a message triggering resource selection by the UE, wherein initializing the second set of resources is based at least in part on receiving the message.

Aspect 5: The method of any of aspects 1 through 4, further comprising: updating the usage information for the second RAT on the wireless channel according to a defined periodicity or a fixed duration prior to data transmission.

Aspect 6: The method of aspect 5, further comprising: updating the usage information based at least in part on one or more of: a change in one or more network conditions, a received indication to update the usage information, or both.

Aspect 7: The method of any of aspects 1 through 6, wherein the second set of resources comprises one or more resources in a time window based at least in part on a resource selection trigger associated with the first set of resources and a bitmap indicating availability of the one or more resources.

Aspect 8: The method of aspect 7, wherein each bit of the bitmap indicates whether a respective time frequency resource is available for the communications associated with the first RAT.

Aspect 9: The method of any of aspects 7 through 8, wherein each bit of the bitmap is mapped to a resource usage fraction value.

Aspect 10: The method of any of aspects 7 through 8, wherein each bit of the bitmap is mapped to a traffic priority value.

Aspect 11: The method of any of aspects 1 through 10, wherein initializing the second set of resources is based at least in part on one or more periodically repeating slot indices.

Aspect 12: The method of any of aspects 1 through 11, further comprising: removing one or more resources from the second set of resources based at least in part on one or more of: control information received at the UE using the first RAT, sensor information, or a combination thereof.

Aspect 13: An apparatus comprising one or more processors; memory coupled with the one or more processors; and instructions stored in the memory and executable by the one or more processors to cause the apparatus to perform a method of any of aspects 1 through 12.

Aspect 14: An apparatus comprising at least one means for performing a method of any of aspects 1 through 12.

Aspect 15: A non-transitory computer-readable medium storing code the code comprising instructions executable by one or more processors to perform a method of any of aspects 1 through 12.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by one or more processors, firmware, or any combination thereof. If implemented using software executed by one or more processors, the functions may be stored as or transmitted using one or more instructions or code of a computer-readable medium. Other examples and implementations are within the scope of the disclosure and appended claims. For example, due to the nature of software, functions described herein may be implemented using software executed by one or more processors, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:

one or more processors;

one or more memories coupled with the one or more processors; and instructions stored in the one or more memories and executable by the one or more processors to cause the apparatus to:

receive, for a wireless channel associated with coexistence of first sidelink communications associated with a first radio access technology (RAT) and second sidelink communications associated with a second RAT, an indication of a first set of resources that are available for communications associated with the first RAT and communications associated with the second RAT;

initialize, for at least transmitting one or more sidelink messages using the first RAT, a second set of resources, the second set of resources comprising a subset of the first set of resources, wherein the second set of resources is based at least in part on usage information for the second RAT on the wireless channel;

select, for transmitting the one or more sidelink messages using the first RAT, one or more resources from the second set of resources; and transmit the one or more sidelink messages using the first RAT and the one or more resources from the second set of resources.

2. The apparatus of claim 1, wherein the instructions are further executable by the one or more processors to cause the apparatus to:

receive an indication of a fraction of the first set of resources that are reserved for the communications associated with the second RAT, wherein the usage information comprises the fraction and wherein the indication of the fraction is associated with a traffic priority value.

3. The apparatus of claim 1, wherein the instructions are further executable by the one or more processors to cause the apparatus to:

monitor the wireless channel for the communications associated with the first RAT; and determine a fraction of the first set of resources that are reserved for the communications associated with the second RAT based at least in part on the monitoring, wherein initializing the second set of resources is based at least in part on the fraction.

4. The apparatus of claim 1, wherein the instructions are further executable by the one or more processors to cause the apparatus to:

receive a message triggering resource selection, wherein initializing the second set of resources is based at least in part on receiving the message.

5. The apparatus of claim 1, wherein the instructions are further executable by the one or more processors to cause the apparatus to:

update the usage information for the second RAT on the wireless channel according to a defined periodicity or a fixed duration prior to data transmission.

6. The apparatus of claim 5, wherein the instructions are further executable by the one or more processors to cause the apparatus to:

update the usage information based at least in part on one or more of: a change in one or more network conditions, a received indication to update the usage information, or both.

7. The apparatus of claim 1, wherein the second set of resources comprises one or more resources in a time window based at least in part on a resource selection trigger associated with the first set of resources and a bitmap indicating availability of the one or more resources.

8. The apparatus of claim 7, wherein each bit of the bitmap indicates whether a respective time frequency resource is available for the communications associated with the first RAT.

9. The apparatus of claim 7, wherein each bit of the bitmap is mapped to a resource usage fraction value.

10. The apparatus of claim 7, wherein each bit of the bitmap is mapped to a traffic priority value.

11. The apparatus of claim 1, wherein initializing the second set of resources is based at least in part on one or more periodically repeating slot indices.

12. The apparatus of claim 1, wherein the instructions are further executable by the one or more processors to cause the apparatus to:

remove one or more resources from the second set of resources based at least in part on one or more of: control information received using the first RAT, sensor information, or a combination thereof.

13. A method of wireless communications at a user equipment (UE), comprising:

receiving, for a wireless channel associated with coexistence of first sidelink communications associated with a first radio access technology (RAT) and second sidelink communications associated with a second RAT, an indication of a first set of resources that are available for communications associated with the first RAT and communications associated with the second RAT;

initializing, for at least transmitting one or more sidelink messages using the first RAT, a second set of resources, the second set of resources comprising a subset of the first set of resources, wherein the second set of resources is based at least in part on usage information for the second RAT on the wireless channel;

selecting, for transmitting the one or more sidelink messages using the first RAT, one or more resources from the second set of resources; and transmitting the one or more sidelink messages using the first RAT and the one or more resources from the second set of resources.

14. The method of claim 13, further comprising:

receiving an indication of a fraction of the first set of resources that are reserved for the communications associated with the second RAT, wherein the usage information comprises the fraction and wherein the indication of the fraction is associated with a traffic priority value.

15. The method of claim 13, further comprising:

monitoring the wireless channel for the communications associated with the first RAT; and determining a fraction of the first set of resources that are reserved for the communications associated with the second RAT based at least in part on the monitoring, wherein initializing the second set of resources is based at least in part on the fraction.

16. The method of claim 13, further comprising:

receiving a message triggering resource selection by the UE, wherein initializing the second set of resources is based at least in part on receiving the message.

17. The method of claim 13, further comprising:

updating the usage information for the second RAT on the wireless channel according to a defined periodicity or a fixed duration prior to data transmission; and updating the usage information based at least in part on one or more of: a change in one or more network conditions, a received indication to update the usage information, or both.

18. The method of claim 13, wherein the second set of resources comprises one or more resources in a time window based at least in part on a resource selection trigger associated with the first set of resources and a bitmap indicating availability of the one or more resources, and wherein each bit of the bitmap indicates whether a respective time frequency resource is available for the communications associated with the first RAT, and wherein each bit of the bitmap is mapped to a resource usage fraction value or a traffic priority value.

19. The method of claim 13, wherein initializing the second set of resources is based at least in part on one or more periodically repeating slot indices.

20. A non-transitory computer-readable medium storing code, the code comprising instructions executable by a processor to:

receive, for a wireless channel associated with coexistence of first sidelink communications associated with a first radio access technology (RAT) and second sidelink communications associated with a second RAT, an indication of a first set of resources that are available for communications associated with the first RAT and communications associated with the second RAT;

initialize, for at least transmitting one or more sidelink messages using the first RAT, a second set of resources, the second set of resources comprising a subset of the first set of resources, wherein the second set of resources is based at least in part on usage information for the second RAT on the wireless channel;

select, for transmitting the one or more sidelink messages using the first RAT, one or more resources from the second set of resources; and transmit the one or more sidelink messages using the first RAT and the one or more resources from the second set of resources.

* * * * *